March 15, 1955 C. E. BEACH ET AL 2,704,187

DATA RECORDS

Filed March 14, 1950

Inventors
C. E. Beach
W. P. Munger

United States Patent Office 2,704,187
Patented Mar. 15, 1955

2,704,187

DATA RECORDS

Clarence E. Beach and William P. Munger, Binghamton, N. Y., assignors to Robert Russell Stratton, Binghamton, N. Y.

Application March 14, 1950, Serial No. 149,542

4 Claims. (Cl. 235—61.12)

This invention relates to data records; and, more particularly, to rendering such records suited for use under conditions involving exposure to circumstances, so adverse of character that records heretofore available would fail to assure dependable results.

It has been proposed that, in places of buiness such, for example, as retail food stores, data records shall be associated with various units or merchandise, and one or more devices provided for sensing or analyzing such records when presented thereto, whereby to ascertain the amount which should be paid for any unit separately sold or the sum of the prices of any group of such units sold in a single transaction; to the end that such unit price or sum of unit prices may be collected from the purchaser, and that all needful and desirable records will be made and tabulations of such records will be effected.

In the interests of brevity and convenience, such records will at times be hereinafter referred to as "tablets" and, correspondingly, the term "analyzers" will be applied to devices or machines which provide for sensing indicia of such tablets and causing ascertainment, display, recordal, classification, and/or distribution to totalizers of significant matters represented by such indicia.

In the course of the aforesaid proposed use, such tablets would, under many circumstances, be subject to handling by stock-men, clerks, checkers and cashiers, and—most serious of all, by customers. Because of exposures to such handlings, tablets of no greater sturdiness than cards usually heretofore commonly provided for analyzing devices and for tabulating machines would be likely to become damaged or impaired to an extent such as would render them incapable of instant use, at any moment, for dependably effecting the intended results.

In this connection, it should be remembered that it has been found needful that cards, such as heretofore provided for similar analysis, shall be so stored and handled as to minimize opportunity for exposure to or for expelling excessive moisture therefrom, before processing in an analyzing or sensing mechanism (even for guarding against wide variations in atmospheric humidity); as well as being protected against exposure to handling by unskilled persons or by those hostile to attainment of results such as should be obtained through use of such cards.

In contrast with such protection and safeguarding, many of the conditions of tablet uses, such as those for which this invention is particularly intended, not only involve exposure to moisture, deformation and mutilation of edges, and to handling by untrained and disinterested persons, but also involve handling by persons who might expect to profit by effecting alteration and mutilation of tablets, as, for example, to thereby effect recordial, indication and/or inclusion in totalizer results, of item prices less than those intended.

It is therefore an important object of this invention to provide, in tablets for use in analyzer machines or apparatus having sensing mechanism for response thereto, structural characteristics which will minimize opportunities for accidentally or maliciously effecting alterations of such tablets whereby to cause improper or unintended response of such apparatus and mechanism when such tablets are processed for intended sensing thereby.

It is a further object to provide tablets suitable for sensing by analyzers such as aforesaid through utilization of perforated or cut-away, raised or depressed areas for effecting the aforesaid ascertainment, display, recordal, classifying, and distribution to totalizers; and, furthermore, of a character facilitating maintainance of supplies of such tablets in variety and number sufficient to provide for any and all intended transactions or items.

It is a further object to devise a form of token or tablet such that processing and completion of what may be termed "token blanks" may be readily and expeditiously effected (as at local stores) by the use of simple mechanism; thereby to condition such blanks to serve for causing intended analyzers to produce records and effect totalizations and classifications thereof suited for any one of a wide variety of utilization circumstances.

It is another object to provide tablets having at least some of the characteristics common to cards adapted for use in prior forms of what are termed "card analyzing devices" and "tabulating machines," while having other characteristics which render such tablets particularly suited for uses in accordance with this invention.

It is another object to provide formation of tablets such that they may conveniently and rapidly be stacked for consecutive responsive sensing in a manner which will assure presentation of each tablet, in its turn, in correct relationship with the sensing mechanism.

Convenience of dependable utilization and simplicity of construction, as well as durability and general ruggedness are other desirable features which have served as objects in the development of this invention.

Further objects and advantages of this invention will become apparent to those skilled in this art in the course of a study of the ensuing description, considered with reference to the annexed claims, and in the light of the accompanying drawings.

Practice of certain of the broader or more general features of this invention involves the use of processing or analyzing mechanism having one or more devices (one device for each order of data to be sensed) which devices are suited for sensing data expressed by the form and/or positioning of certain structural features of data record or token tablets to be sensed thereby; which structural features comprise obstructions or barriers situated in the paths of feeler members of respective sensing devices which paths are disposed substantially parallel with the faces of tablets during positioning thereof for scanning of the data expressed thereby. The determination of the nature of the data of each order being established by the extent of such movement which occurs prior to the stage thereof at which the feeler member encounters the barrier or obstruction.

End walls of slots in data record or token tablets (through which slots an associated feeler member may move during data analysis) may serve as the aforesaid barriers or obstructions, or such barriers or obstructions may be provided in one or another of various other forms.

Practice of other of the broader or more general features of this invention involves provision of data records or token tablets of a character which suits them for processing or analysis of the data expressed thereby through the use of mechanism of the aforesaid character.

Figure 1:
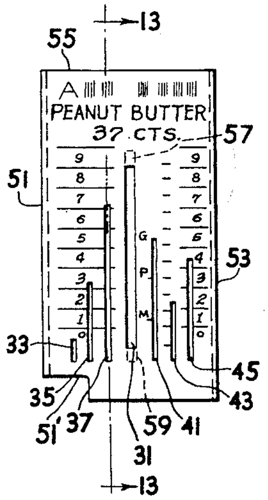
Figure 1 is a plan view of the upper surface of a tablet which embodies this invention.
Figure 10:
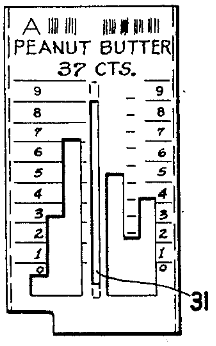
Figures 3, 4, 5:
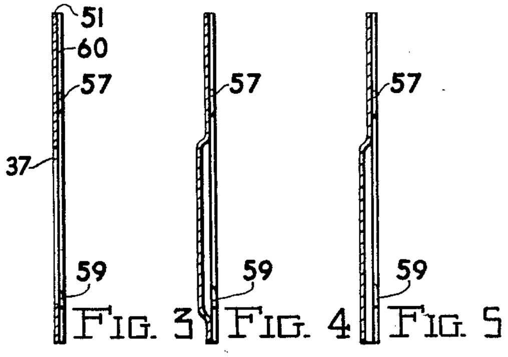
Fig. 3 is a sectional view taken on the line 13—13 of Fig. 1.
Figure 11:
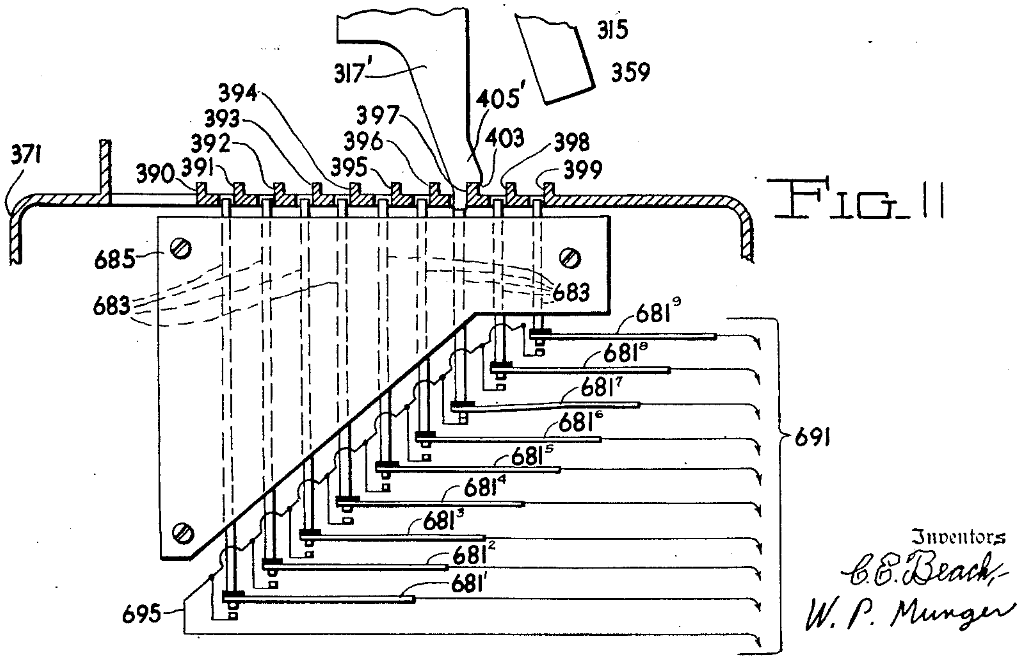

Figs. 4, 5, 6, 7, 8, and 9 are sectional views, similar to that of Fig. 3, including certain alternative structural details;

Fig. 10 is a plan view of the upper surface of tablet structure similar to that of Fig. 1, incidentally showing another alternative feature; and Fig. 11 is a fragmentary elevational view, partially in section, showing a system of contacts whereby certain sensing mechanism suited for scanning tablets embodying this invention may be utilized for controlling electric circuits.

In order to facilitate understanding of this invention, reference may be had to copending application, divisional herefrom and filed June 30, 1953, Serial No. 364,982; in which application there is illustrated and described mechanism which is specially suited for scanning or sensing tablets constructed in accordance with this invention.

Reference numerals hereinafter occasionally mentioned are similar to the numerals correspondingly applied in the above referred-to copending application.

It will be well to here note that references hereinafter made to a "rearward" direction denotes a direction toward the end 55 of a tablet such as that of Fig. 1. A "forward" direction denotes that opposite to the one just described. The "upper side" refers to sides of tablets such as shown in Figs. 1 and 10, while the "under" or "bottom" is the opposite side as, for example, the side 60 indicated in Fig. 2.

Tablets embodying this invention are especially suited for use with processing or analyzing mechanism comprising a magazine in which the tablets may be stacked in preparation for effecting determinations of the nature of the data which they are intended to express, together with transport and locating systems for singly withdrawing tablets from such magazine and transferring them to a sensing location and for accurately locating and positioning tablets in such sensing position, together with mechanism for scanning or sensing the tablet-expressed-data, while the tablet is being so held. The transport system provided in such a processing or analyzing mechanism includes parts including a picker for engaging and applying pressure against an edge of a tablet, while in the magazine, at portions of such edge adjacent the ends thereof, thereby to effect transfer of the tablet from the magazine to the sensing position; the locating mechanism comprises a locater blade which is resiliently urged into an opening provided therefor in the tablet, so as to snugly engage walls of such opening thereby to effect accurate positioning of the tablet for and during sensing of data slots therein, and for thereafter moving the tablet away from the sensing location; and the scanning or sensing mechanism comprises feelers (one feeler for each order of data to be sensed), which feelers are resiliently urged by the mechanism to move along paths extending substantially parallel with a face of the tablet while it is being held by the locating mechanism in positioning for scanning, the determination of the nature of the data of each order being established by the extents of such feeler movements occurring prior to the stages thereof in which feeler members encounter barriers or obstruction, in order that end walls of tablet-slots or other structural token-characteristics may serve as the aforesaid barriers or obstructions.

Tablets constructed in accordance with this invention may be of various materials such as, for example, paper-, card-, press-, or fibre-board; as well as metal or molded plastic or other material.

Referring now to Fig. 1, the tablet there shown has a guide slot 31 intermediate and substantially parallel with the edges 51 and 53 thereof, together with six data expressing slots, of which slots 33, 35 and 37 are at one side of and substantially parallel with said guide slot, and the slots 41, 43 and 45 are correspondingly disposed at the other side of said guide slot. For the purposes of the present description, it is unnecessary to make detailed reference to the utilization of the data expressing slots 43 and 45.

Said data expressing slots extend from what may be considered a zero positioning adjacent the forward end of the tablet toward the end 55 thereof for distances representative of the numerical or other characteristics of data of the orders respectively expressed thereby.

It is considered desirable that tablets used in retail stores shall have a legend printed thereon representative of the data expressed by the aforesaid slots. Such a legend is shown near the end 55 of the tablet of Fig. 1, and in the corresponding portion of the tablet of Fig. 10.

For reasons which will be hereinafter more fully set forth, said edges 51 and 53, and material detached from portions of the slot 31 adjacent the ends 57 and 59 thereof, are here shown as folded under. Such folded under portions will be, at times, hereinafter referred to as "runners."

It will be noted that the surface 51' of the left-hand forward edge of the tablet of Fig. 1 is further rearward than the right-hand end of said edge; this for the purpose of cooperating with walls of the magazine of the intended sensing or scanning mechanism so as to assure that such tablets can be stacked therein only when their positioning is what might be termed "right side up and right end to."

It should be understood that tablets embodying this invention may be of one or another of various diverse sizes and shapes. For example, tablets similar to that of Fig. 1 may be shortened by reducing or eliminating the area provided near the end 55 for the inscription. The tablets may be broadened, to provide for additional data-grooves or fields; or may be narrowed by decreasing the number of such fields as, for example, by omitting space for expressing data of subjects such as indicated by slots 41, 43, and 45.

In the use of tablets embodying this invention, such tablets may be stacked in the magazine of a sensing or analyzing mechanism, and a so-called picker is utilized for removing them from the magazine one by one, and transporting them to a sensing or scanning position.

Because of the folded under edges of the tablets, positioning of such pickers for withdrawing individual tablets does not involve considerations of extreme accuracy. In this connection it should be noted that were the tablets of material of texture and thickness such as ordinarily heretofore utilized for record cards and other data tablets, without folding under of the edges, it would be necessary to avoid having the picker lifted high enough to permit it to engage the forward edges of two tablets, while it would also be very important that the picker shall be lifted high enough to surely withdraw one tablet for each cycle of the operation of the mechanism.

In the use of mechanisms such as contemplated for sensing or scanning tablets embodying this invention, there would be likelihood of incorrect results if a cycle of the machine could be accomplished without placing a tablet in the sensing location, and the feelers would then be permitted to unobstructively move for their maximum travel.

On the other hand, if two tablets were simultaneously withdrawn from the magazine, incorrect sensing would result if a second tablet is allowed to escape from the magazine with the intended one. If such second tablet did not escape, although it has been seized by the picker, the operation of the machine would be jammed or suspended, with very unfavorable results should this occur in a retail store with resultant delays ascertaining the sum which a given customer should pay for the goods they have selected.

In fact, not only would such clogging of the machine delay the customer whose tablets were being processed by the machine when such jamming occurred, but, more serious still, other customers waiting to have tablets expressing sums payable for their puchases would be detained until the machine could be cleared for further operation.

It should also be incidentally noted that, if equally thin tablets were used without such folded-over edges, it would become necessary to provide a high degree of accuracy in the size of the opening through which tablets may slide out from the bottom of the stack; while, when such folded-over edges are provided, the effective tablet thickness is so increased that a convenient clearance may be provided in the magazine base-opening for withdrawal of tablets, without endangering simultaneous withdrawal of two tablets.

It should be still further noted that, for uses such as those for which tablets embodying this invention are particularly intended, there are frequent opportunities for surfaces of such tablets to become more or less coated with adhesive substances so that, if entire adjacent tablet surfaces are in contact, it becomes extremely difficult, if not impossible, for the picker mechanism to effect withdrawal of tablets singly and, even when such withdrawals may be effected, there is strong likelihood of mutilation of tablets.

Figure 2:
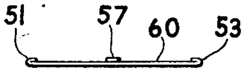
Fig. 2 is an end elevational view of the tablet of Fig. 1.
Figures 6, 7, 8, 9:
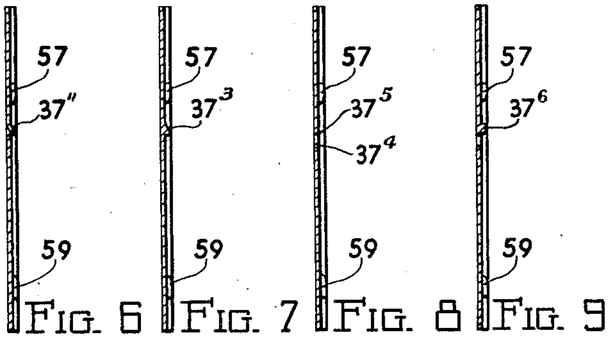

It should be understood that various changes may be made in the tablet structure from that shown in Figs. 1, 2 and 3. For example: by substituting embossed grooves such as shown by Figs. 4 and 5 for the fully cut-through grooves contemplated by Figs. 1 and 3; by having grooves extend to the forward edge of the tablets as shown in Fig. 4; by providing downwardly extending barriers such as the barrier 32'' shown by Fig. 6; and/or by having barriers such as 37$^3$ cast integral, as shown in Fig. 7, instead of being formed by embossing action, as in the case of Fig. 6.

We claim and desire to secure by Letters Patent of the United States of America:

1. An article for providing a record from which expressions of several data items may be obtained by the use of an analyzing machine of the type having sensing feelers, one feeler for each order of data to be expressed, which machine acts during scanning to cause bodily movement of such feelers in paths disposed along the lengths of articles being scanned until such feelers encounter barriers to their further movement, said article comprising a sheet of material having slots therein of different lengths representative of different data values and of formations suited for permitting penetration of said feelers therein, said article further having an opening therethrough substantially parallel to and intermediate certain of said slots for receiving a positioning blade, the length of said opening being at least a major fraction of the greatest intended length of such slots.

2. An article as defined in claim 1 wherein certain end-walls of such slots are intended to serve as barriers to such feeler movements and the material of said article being folded back upon itself at the barrier forming ends of said slots.

3. An article as defined in claim 1 wherein said end-walls of such slots are intended to serve as barriers to such feeler movements, the material of said article being folded back upon itself at the barrier forming ends of said slots, and the thickness of those edges of said article which are of major length being substantially greater than that of the principal surfaces of said article.

4. An article as defined in claim 1 wherein said end-walls of such slots are intended to serve as barriers to such feeler movements, the material of said article being folded back upon itself at the barrier forming ends of such slots, and those edges of said article which are of a major length being folded back upon themselves to form thicknesses substantially greater than that of the principal surfaces of said article.

References Cited in the file of this patent

UNITED STATES PATENTS

| | | |
|---|---|---|
| 758,861 | Shaffer | May 3, 1904 |
| 1,334,957 | Liedstrand | Mar. 30, 1920 |
| 1,509,513 | Liedstrand | Sept. 23, 1924 |
| 2,110,854 | Fuller et al. | Mar. 15, 1938 |
| 2,169,213 | Backdahl | Aug. 15, 1939 |
| 2,407,196 | Watson | Sept. 3, 1946 |
| 2,414,643 | Gollwitzer | Jan. 21, 1947 |
| 2,416,625 | Hooper | Feb. 25, 1947 |
| 2,429,730 | Pitman | Oct. 28, 1947 |
| 2,442,970 | Carroll et al. | June 8, 1948 |
| 2,484,642 | Paris | Oct. 11, 1949 |
| 2,493,848 | Ayres | Jan. 10, 1950 |
| 2,501,444 | Gollwitzer | Mar. 21, 1950 |